United States Patent

Scheinkoenig et al.

[15] 3,700,259
[45] Oct. 24, 1972

[54] FENDER LOUVER

[72] Inventors: Robert J. Scheinkoenig, Franklin; Robert C. Haupt, Milwaukee, both of Wis.

[73] Assignee: Allis-Chalmers Corporation

[22] Filed: Nov. 2, 1970

[21] Appl. No.: 85,864

[52] U.S. Cl. ............................................. 280/152 R
[51] Int. Cl. ............................................. B62b 9/16
[58] Field of Search ..280/152, 152 B, 153, 157, 159; 180/1 F, 54 D, 84; 296/28 C, 137 R, 84 E; 293/58; 172/508, 509, 430; 160/DIG. 7, 206, 231

[56] References Cited

UNITED STATES PATENTS

| 3,231,292 | 1/1966 | Lorenz | 280/157 |
| 3,290,088 | 12/1966 | Wilfert | 296/137 R |
| 1,612,944 | 1/1927 | Richardson | 293/58 X |
| 1,463,944 | 8/1923 | Fishleigh | 280/152 B |
| 2,366,224 | 1/1925 | Warp | 160/DIG. 7 |
| 2,492,909 | 12/1949 | Warp | 160/DIG. 7 |
| 2,943,675 | 7/1960 | Ford | 160/206 |
| 3,173,475 | 3/1965 | Wegner | 160/231 X |

FOREIGN PATENTS OR APPLICATIONS

| 297,829 | 10/1916 | Germany | 280/152 R |
| 986,049 | 3/1951 | France | 280/153 R |
| 473,134 | 7/1952 | Italy | 280/152 R |

*Primary Examiner*—Benjamin Hersh
*Assistant Examiner*—Robert R. Song
*Attorney*—Arthur L. Nelson, Kenneth C. McKivett and Robert B. Benson

[57] ABSTRACT

A fender louver on the rear wheel fender of a tractor to provide visual means of determining the condition of wheel rotation.

10 Claims, 5 Drawing Figures

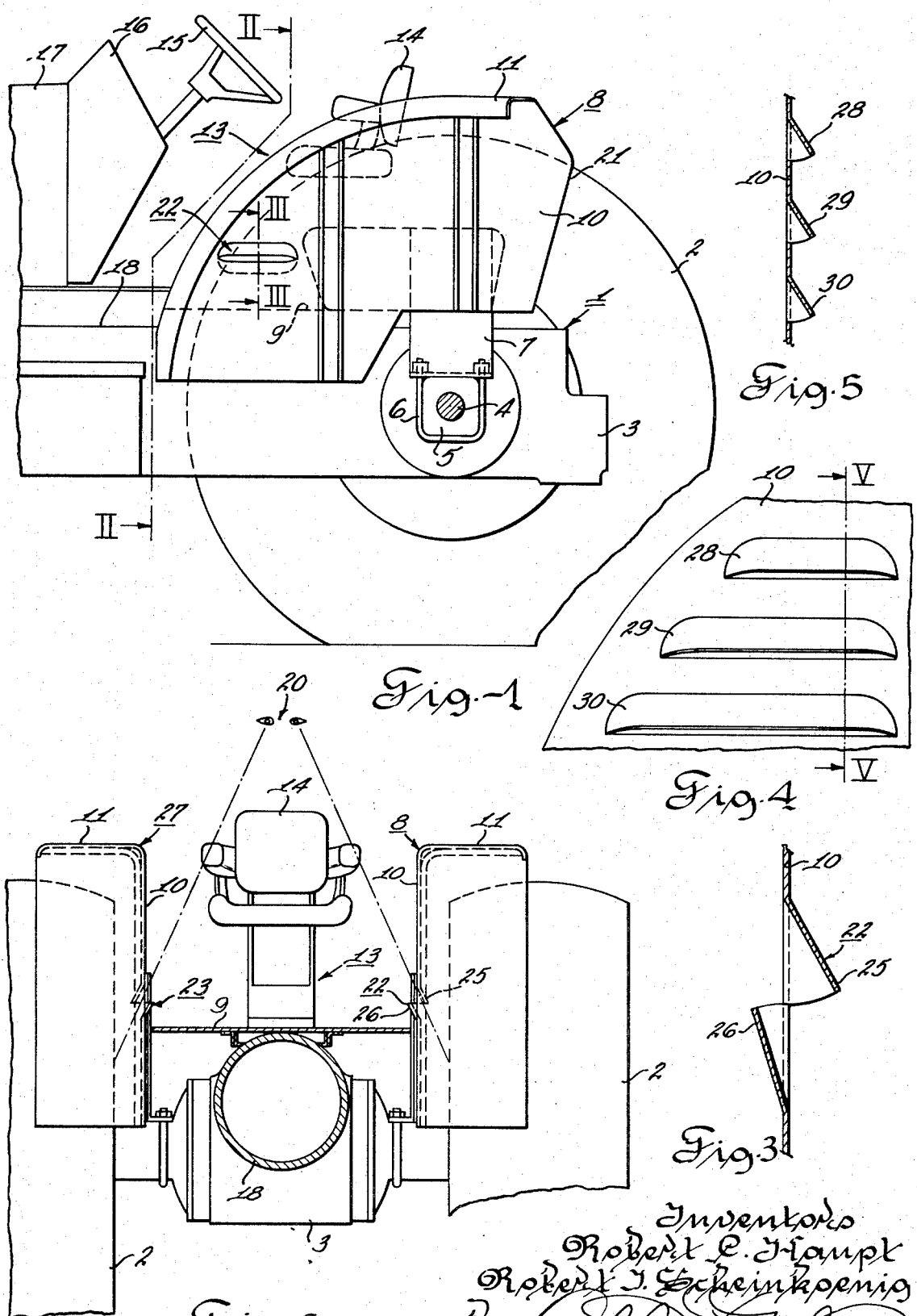

FENDER LOUVER

This invention relates to rear wheel fenders for a tractor and more particularly to a louver in the fender positioned to permit the operator to determine at a glance the condition of rotation of the rear wheels during operation of the vehicle.

Tractors have been constructed with wheel guards to prevent the operator from engaging the rotation rear wheel of the vehicle. The area of protection by the wheel guard in some instances has been quite limited where it consists essentially of a triangular shaped upright panel mounted on the rear axle housing and extending vertically between the moving wheel and the operator. As a safety device, this is not always proved to be adequate and the trend today is towards a larger wheel guard such as a fender which extends from the platform and radially from the axle housing on the side of the vehicle upwardly and rearwardly around the wheel for at least 120° of wheel rotation and having a right angle section extending axially around the periphery of the wheel with adequate clearance to permit rotation of the wheel. A fender of this construction provides a safer condition for the operator and since it is connected to the platform it prevents the wheel from throwing dirt and other material on the platform particularly under conditions where the ground is wet and muddy. While the fender of this size covers a substantially larger area of the wheel and provides safer operating conditions, the operator of the vehicle is unable to sense the condition of rear wheel rotation or slippage of one of the wheels. Sensing rear wheel slippage is necessary to maintain good traction of the wheels to avoid excessive differential action which can result in one wheel digging itself into the ground especially under extreme conditions.

It is necessary for maintaining traction control of the tractor under these conditions to know whether one or the other of the wheels is slipping. The operator has a tendency to assume a unnatural position by leaning from one side of the tractor to the other or even to the extent of leaving his seat to peer over the side to see if one of the wheels slipping. Accordingly this invention provides a means whereby the operator can visually observe the rotating condition of each of the wheels. This is provided by the use of a louver in each of the fenders forwardly and downwardly from the operators point of visual observation for the operator to peer through the louvers in the fenders. The provision of a louver whereby an opening extends through the fender with means for shedding dirt and foreign material which are carried around with the wheel during operation has an advantage over the use of a glass or plastic or other transparent material on the fender which soon loads up with dirt and becomes opaque and defeats its purpose in providing visual means for observing and rotating condition of the wheels.

It is an object of this invention to provide a fender louver for visually observing the condition of wheel rotation.

It is another object of this invention to provide louvers in the rear wheel fenders at a convenient position for the operator to visually sense wheel rotation.

It is a further object of this invention to provide rear wheel fender louvers which shed dirt and water carried around under the fender due to wheel rotation and provide an opening serving as a visual means for the operator to readily determine the condition of rotation of the rear wheels.

The objects of this invention are accomplished by providing a tractor having an operator's station intermediate the two fenders of the rear wheels. The fenders extend forwardly and downwardly about the periphery of the wheel and are connected to a platform intermediate the fenders. Since each fender covers a substantial portion of the wheel visual observation of wheel rotation is almost impossible for the operator. Accordingly a louver forming an opening through the fender is provided forwardly and downwardly of the operator's point of observation. The louver extends outward from a horizontal slit in a vertical surface defined by the fender toward the wheel and sheds dirt which is carried around by the wheel during rotation. A similar construction may also be provided on the fender extending inwardly and upwardly to increase the opening area of the louver for observation by the operator and which does not incur any additional likelihood of the wheel loading dirt in the opening of the louver. Accordingly the operator can visually observe the condition of rotation of the rear wheels when the vehicle is in operation.

The preferred embodiments of this invention are illustrated in the attached drawings.

FIG. 1 shows a side elevation view of the left hand fender with the left hand rear axle in section;

FIG. 2 illustrates a front view taken along line II—II of FIG. 1 showing the operator station with the drive shaft housing in section and showing the point of visual observation of the operator for viewing through the louvers;

FIG. 3 is a section view being taken along line III—III in FIG. 1 showing the preferred embodiment of the louver arrangement with a portion of the fender pressed out above and pressed in below the line of vision to increase the area of observation through the louver;

FIG. 4 is a modification of the louver arrangement wherein a plurality of louvers are shown on the fender; and FIG. 5 is a view in section through the louvers taken along line V—V in FIG. 4.

Referring to the drawings, FIG. 1 shows a tractor 1 with the right hand wheel 2 mounted for rotation relative to the rear housing 3. The left hand drive shaft 4 is shown in the drive shaft housing 5 carrying a U-bolt 6 connected to the support 7.

The left hand fender 8 is mounted on the support 7 and extends forwardly and downwardly to engage the platform 9. The fender 8 forms a vertical wall 10 connected to a right angle flange 11 which extends peripherally around the wheel. The operator's station 13 includes a seat 14 mounted ahead of the rear edge of the fender 8. The seat is positioned rearwardly of the steering wheel 15 which extends forwardly into the shroud 16 mounted on the engine hood 17 which is supported forwardly of the platform 9 and supported by the drive shaft housing 18.

The operator's station 13 is located so that the operator can conveniently control operation of the vehicle. The point of visual observation 20 for the operator, however, is forwardly of the rear end 21 of the fender and it is inconvenient for the operator to look behind himself to see any movement of the rear wheels. In looking to the sides the fenders obscure his vision of rear wheel movement. Accordingly he is unable to sense the condition of movement of the rear wheels without the aid of the louvers 22 and 23 as shown in FIGS. 1 and 2. At the point of visual observation 20 the operator can look through either of the louvers and see the motion of the rear wheels through the fenders. The vertical panel 10 of the fender forms the louver 22. The louver is formed by pressing a portion of the vertical wall 10 outboard to form a slatted panel 25 for shedding water and dirt which is carried around with the rear wheel 2 during its rotation. To increase the area of view through the louver a similarly slatted pane 26 is pressed inboard to essentially form an oblong horizontal opening permitting the operator to obliquely view wheel rotation through the fender. The construction of the left hand fender 8 and the right and fender 27 are symetrical. One or more louvers 22 may be constructed on the vertical wall 10 of the fender 8. It is also understood that the louver structure might be welded or rivetted to a fender having a perforation.

FIG. 4 illustrates a modification wherein a plurality of louvers 28, 29 and 30 are positioned vertically over each other. The length of each opening of the louvers 30, 29 and 28 may be decreased in length to accomodate the rearward curvature of the fender as shown in FIG. 4. The length of the louver opening would be determined primarily by area of available space for forming the louver on the vertical panel 10 of the fender. The louver may be positioned any place on the fender but preferably in a convenient position for viewing wheel rotation. The louvers as shown in FIGS. 4 and 5 are a modification wherein only a single slatted panel is pressed outboard from the vertical wall 10. With a plurality of louvers vertically in spaced relation to each other, the upper louvers would have a tendency to deflect the dirt outwardly before it engages the lower louver and would consequently keep the lower louvers cleaner during normal operation.

The operation of the invention will be described as follows. The fenders 8 or 27 are mounted on the side of the operator's station 13 and extend upwardly and transversely from the platform. The size of the fender is sufficient to substantially obscure the operator's view of the rear wheels. Accordingly, it is not possible for the operator to determine the relative rate of wheel rotation when positioned at the operator's station and viewing the operation of the tractor from the normal point of observation 20.

Accordingly to overcome this problem louvers 22 and 23 are positioned forwardly and downwardly from the point of visual observation of the operator. Each louver forms an inclined opening through the fender on the vertical wall 10 of the fenders between the operator and the rear wheel. The operator can view obliquely through the fender and sense differential rotation of the rear wheels at a glance. Accordingly he is able to control the tractor speed, and torque applied to the rear wheels in accordance with the draft load to prevent differential rotation of the rear wheels which may be caused by lack of traction of one wheel relative to the other. It is well known that in operating a tractor if the movement of the tractor can be maintained, the tractor can often be brought through the slippery, muddy area since the momentum of the tractor helps to carry the draft load. Once the tractor has stalled it is almost impossible to again gain momentum since the traction for the rear wheels is not sufficient to accelerate the mass of the tractor and carry the draft load. With the operator being able to visually sense the rotation of the wheels and maintain the momentum of the tractor and the implement he can often prevent stalling and down time which can be costly.

The fender louver shown in FIG. 3 has a portion of the fender pressed to incline outwardly and also a portion pressed to incline inwardly to increase the cross sectional area of the viewing opening in the fender. The upper slotted panel 25 operates to shed dirt carried around because of rotation of the rear wheels. The lower slotted panel 26 increases the viewing area of the operator as he views obliquely through the fender at the rear wheels.

A modification may be provided by using the plurality of louvers 28, 29 and 30 as shown in FIGS. 4 and 5. This provides the advantage that if for some reason one of the louver openings is obscured and prevents viewing of the rear wheel motion chances are one of the other louvers will remain open. A plurality of louvers as shown in FIG. 3 might also be used in the same manner as the plurality shown in FIG. 4. The length and arrangement of the plurality of louvers may be determined by the needs required and the available space for positioning the louvers on the vertical fender panel on the inboard side of the rear wheel.

The embodiments of the invention in which an exclusive property or privilege is claimed are defined as follows:

1. A visual means for sensing the condition of drive wheel rotation comprising, a vehicle, means defining an operator station for the operator of said vehicle and generally defining an area of normal visual observation, at least one drive wheel driving said vehicle, a fender covering a substantial portion of said drive wheel and blocking view of the wheel from the area of visual observation, at least one louver in said fender between the area of visual observation and said wheel including means shielding the louver opening from the wheel side of said fender to shed foreign material caused by the rotation of said wheel and permit visual observation of the condition of wheel rotation.

2. A visual means for sensing the condition of drive wheel rotation as set forth in claim 1 comprising, two drive wheels with a wheel on each side of the vehicle, means defining said operator station between said wheels, means defining said louvers on said fenders forwardly and downwardly from the area of observation including means defining a downwardly inclined opening to permit the operator to obliquely view through said fenders to visually sense rotation of said wheel.

3. A visual means for sensing the condition of drive wheel rotation as set forth in claim 1 wherein said louver includes a vertical wall on said fender, a slatted panel pressed outboard and downwardly of said panel on said fender to thereby form a single louver on said fender.

4. A visual means for sensing condition of wheel rotation as set forth in claim 1 wherein means define a plurality of louvers in said fender for visually observing wheel rotation of said tractor.

5. A visual means for sensing condition of wheel rotation as set forth in claim 1 wherein said fender comprises a substantially vertical wall intermediate said wheel and said operator's station, a slatted panel pressed outwardly and downwardly forming a slot in said vertical wall, a second slatted panel pressed inwardly and upwardly adjacent said slot thereby increasing the cross sectional area for visual observation of the condition of wheel rotation.

6. A visual means for sensing condition of wheel rotation as set forth in claim 1 wherein said fender comprises a substantially vertical wall, a plurality of elongated slatted panels pressed outwardly and downwardly from said vertical wall to thereby form a plurality of louvers in said vertical wall of said fender.

7. A visual means for sensing condition of wheel rotation as set forth in claim 1 wherein said fender defines a substantially vertical wall, means defining a slit in said panel, said louver includes an elongated slatted panel pressed outwardly of said wall immediately above said slit, an inwardly elongated slatted panel immediately below said slit to thereby increase the cross section area of the opening for oblique visual observation of the condition wheel rotation.

8. A visual means for sensing condition of wheel rotation as set forth in claim 1 wherein said louver defines an elongated horizontal opening formed in said fender for visual observation of condition of wheel rotation.

9. A visual means for sensing condition of wheel rotation as set forth in claim 1 wherein said fender defines a substantially vertical wall, an outwardly and downwardly slatted panel and an inwardly upwardly slatted panel defining said louver, said slatted panels defining substantially parallel sides of said louver for oblique visual observation through said fender for sensing condition of wheel rotation.

10. A visual means for sensing condition of wheel rotation as set forth in claim 1 wherein means define unitary construction fender panel and louver of said fender.

* * * * *